Aug. 26, 1947.  O. E. DE LANGE  2,426,182

TIME DIVISION RADAR RANGING SYSTEM

Filed Oct. 1, 1943  3 Sheets-Sheet 1

FIG. 1

INVENTOR
O. E. DELANGE
BY
H. O. Wright
ATTORNEY

Aug. 26, 1947.    O. E. DE LANGE    2,426,182
TIME DIVISION RADAR RANGING SYSTEM
Filed Oct. 1, 1943    3 Sheets-Sheet 2
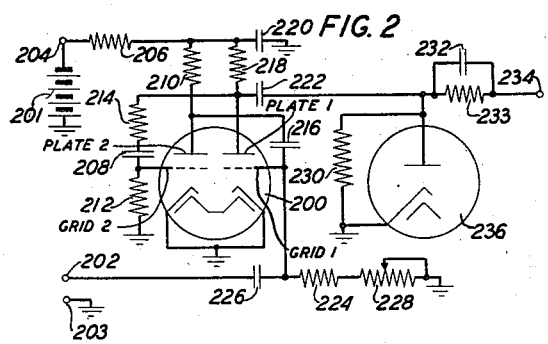
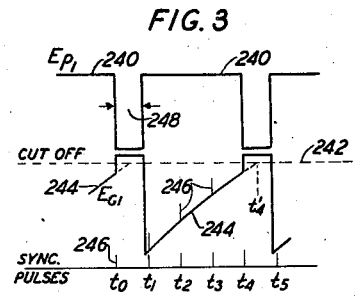
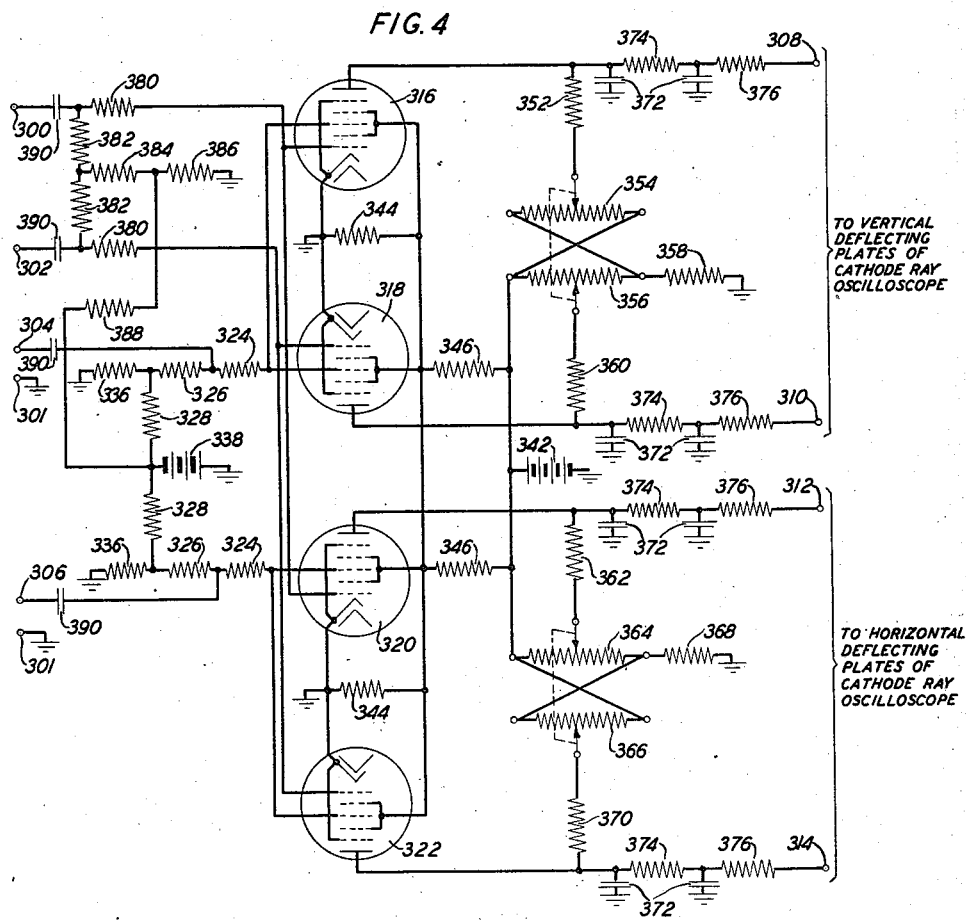
INVENTOR
O.E. DELANGE
BY
H.O. Wright
ATTORNEY Aug. 26, 1947.  O. E. DE LANGE  2,426,182
TIME DIVISION RADAR RANGING SYSTEM
Filed Oct. 1, 1943  3 Sheets-Sheet 3

INVENTOR
O. E. DELANGE
BY
H. C. Wright
ATTORNEY

Patented Aug. 26, 1947

2,426,182

UNITED STATES PATENT OFFICE 2,426,182

TIME DIVISION RADAR RANGING SYSTEM

Owen E. De Lange, East Orange, N. J., assignor to Bell Telephone Laboratories, Incorporated, New York, N. Y., a corporation of New York Application October 1, 1943, Serial No. 504,577

4 Claims. (Cl. 250—1.62)

This invention relates to improved radio energy reflection type target locating systems for use in gun-directing systems. More particularly it relates to improvements in such target locating systems by means of which shell splashes and shell bursts may be located simultaneously with observations of the target's range and direction.

It is obviously important to be able to detect shell bursts or shell splashes in order to make fire control corrections.

Difficulty arises since the reflections of the exploratory radio energy from shell bursts or shell splashes are of relatively small amplitude in comparison with reflections from normal targets such as ships or large aircraft at substantially the same range.

Furthermore, since direction is determined by pointing a beam, or highly directive lobe, of energy and since the front, or point, of directive radio beams obtainable with scanning antenna arrangements of practicable bulk in the present state of the art, are nearly flat (or blunt) throughout an arc of approximately 5 degrees, it is necessary, for more accurately determining the direction of a reflecting object, to move the beam through an arc of several degrees and to, in effect, determine the direction of the beam for which the amplitude of the reflected energy begins to very definitely decrease.

Expressed in other words, the point of the beam is flat (or blunt) throughout an arc of approximately 5 degrees, that is, for approximately 2½ degrees on either side of the longitudinal axis of the beam substantially uniform amplitude of reflected energy will be received. Beyond this arc, i. e., on the "shoulders" of the beam, the amplitude of received signals begins to fall off fairly rapidly so that at a "shoulder" of the beam, or at about 3 degrees from its longitudinal axis in a typical case, appreciable changes in the amplitude of the received signal result from changing the direction of the axis of the beam by a fraction of a degree.

Several arrangements for making use of the "shoulder" of the beam to obtain more accurate directive indications have been devised. For example, in an arrangement to be described in detail below, the longitudinal axis of the beam is rotated about the normal axis of the antenna system, the longitudinal axis of the beam being maintained at an angle of substantially 3 degrees with respect to said normal axis. When, with this arrangement, the reflecting object is on the normal axis of the antenna system, the received reflected signals from the object will not vary in amplitude as the beam rotates. However, if the object is a fraction of a degree or more from the normal axis, the amplitude of the reflected signals will increase as the rotating beam axis approaches the object and decrease as it swings to the opposite side of the normal axis. This produces an amplitude modulation of the reflected signal, the phase of which modulation is an index of the direction in which the normal axis of the antenna must be moved to bring it into alignment with the object. To facilitate determination of the phase of this amplitude modulation, a small sinusoidal generator is driven in synchronism with the rotation of the beam and voltages derived from the generator are used as phase reference standards. These matters will become more readily apparent in connection with the description of a representative system which is given hereinunder. For the present it should be borne in mind that some arrangement of this general type is essential for providing accurate directional indications for gun pointing purposes.

For normal ranging and direction determining operations it is, moreover, desirable that the overall receiving gain be regulated to produce a signal of satisfactory and substantially constant amplitude from the particular reflecting object under observation. Gain regulation should be such as to eliminate amplitude variations other than those resulting from rotation of the beam as above described. That is, random amplitude variations resulting from "fading" or from "noise" or from the turning of the object to present smaller or larger effective reflecting surfaces, and the like should be eliminated as nearly as practicable by automatic gain control devices. Obviously the gain should not be maintained continuously at an excessive value or the receiving circuits will become overloaded. Also if the gain is maintained at that value which is just sufficient to provide satisfactory signals, trouble from interfering effects such as "noise" arising in circuit elements, "crosstalk" from other electrical apparatus in the neighborhood and the like will be reduced. Spurious amplitude variations are also objectionable in that they may interfere with the determination of the phase of the amplitude modulation employed in accurate direction determinations as above described.

Because of such considerations radio target locating systems preferably include automatic gain control circuits operating to stabilize the overall receiving gain at a value suitable for the particular reflected signals with which observations are being made at any particular time. A typical gain control circuit arrangement will be described below.

A principal object of the present invention, therefore, is to provide, for use in such target locating systems, methods and means for observing simultaneously much weaker reflected signals arising from shell splashes or shell bursts in the vicinity of a target from which relatively strong reflections are being received, without appreciably interfering with the normal ranging and direction determining functions of the system as outlined above.

It has been discovered that this object can satisfactorily be accomplished by a method of time division in which part of the time the system functions normally to provide ranging and directive indications with respect to the target and the remainder of the time it functions at high gain to provide range indications with respect to the relatively weak echoes from shell splashes or shell bursts, the highly sensitive direction indicating circuit being automatically protected from misleading or injurious surges during the periods of operation at high gain, but being instantaneously restored for normal operation during intermediate periods. Because of the retentive properties of the screens of the cathode-ray oscilloscopes usually employed as indicators, normal and auxiliary indications can appear to be continuously and simultaneously provided.

Other objects will become apparent during the course of the following description and from the appended claims. The principles of the invention will be more readily understood in connection with the detailed description of a typical radio target locating system embodying these principles and typical apparatus units for such a system as shown in the accompanying drawings in which:

Fig. 1 illustrates in block diagrammatic form a typical radio target locating system embodying the principles of the invention;

Fig. 2 shows a schematic diagram of one form of blanking pulse generator suitable for use in the system of Fig. 1 for blanking out the automatic gain control of the receiving amplifier and the gate amplifier or the gate triggering pulse amplifier of the train and elevation indicating circuit;

Figure 5:
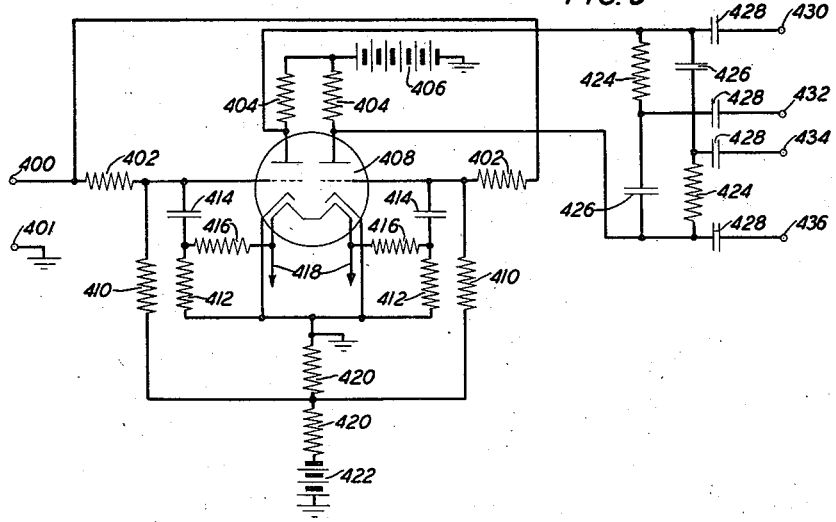
Figure 6:
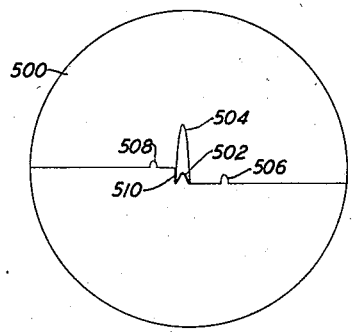
Figure 7:
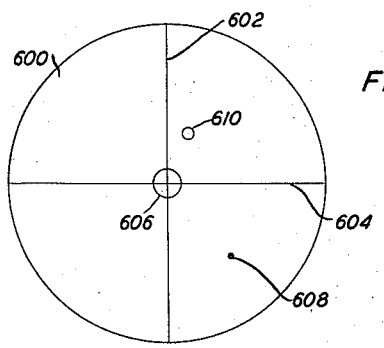

Fig. 3 comprises wave form diagrams employed in explaining the operation of the circuit of Fig. 2;

Fig. 4 shows in schematic diagram form a suitable phase indicating circuit for the train and elevation indicating circuit of Fig. 1;

Fig. 5 shows in schematic diagram form a suitable no signal or zero signal indicating circuit for the train and elevation indicating circuit of the system of Fig. 1; and Figs. 6 and 7 show typical indications obtained on the screens of the range oscilloscope and the train and elevation indicating oscilloscope, respectively, of the system of Fig. 1.

In more detail in Fig. 1 an oscillator 10 furnishes a sine wave of suitable frequency for synchronizing a pulse generator to provide pulses spaced appropriately for the ranging measurements to be made by the system. By way of example, a frequency of 4,000 cycles per second would provide 4,000 pulses per second. The interval between pulses would be 1/4000 second and the maximum range of the system would then be approximately 20 miles since the emitted radio pulses would travel at 186,000 miles per second and must travel 40 miles in going to and being reflected back from an object 20 miles distant from the system. Longer distances would obviously require lower pulsing rates. Also, to increase the life of the apparatus, particularly of the transmitting tubes, a lower pulsing frequency may be found desirable. Of course, greater detail or clearer echo signals can be obtained at higher pulsing rates, within the frequency limit set by the necessity of receiving the echo from a particular pulse before the next successive pulse is sent out. In general, systems of the type illustrated in Fig. 1 can be conveniently operated at pulsing rates between 500 and 5,000 pulses per second, a rate in the neighborhood of 2,000 pulses per second being usually employed.

The sine wave output of oscillator 10 is supplied to pulse generator 12 which can be of any of the types well known in the art, for example, of the type employing a non-linear coil or any of the numerous "multivibrator" type pulse generating circuits. The pulses are preferably very short, that is, of the order of one microsecond or less in duration and are preferably squared top pulses as these permit transmission of greater energy during the short pulse interval.

Pulses from generator 12 are amplified in pulse amplifier 14 and thereafter actuate transmitter 16 to emit pulses 18 which in turn energize antenna 34 to emit radio energy pulses 36.

Antenna 34 is, by way of example, an eccentrically mounted quarter-wavelength antenna, the lower end as shown in Fig. 1 being at the focus of paraboloidal bowl reflector 32. Because of the eccentricity of antenna 34 the axis of the radio beam will be at a small angle (for example, approximately 3 degrees), with respect to the axis of the paraboloidal reflector. The conductor 30 support-antenna 34 is coupled to the shaft 26 of motor 22 by insulating coupling 40 and in operation is continuously rotated by motor 22. As antenna 34 rotates the axis of the radio beam will rotate about the axis of reflector 32, in geometrical terms, describing a conical surface of which the axis of the reflector is the longitudinal axis. Brush 28 and slip ring 24 connect conductor 30 to the transmitting and receiving apparatus. Rotation of antenna 34 effects the rotation of the radio beam about the axis of reflector 32 for the purpose of obtaining more accurate directional indications, as described in detail above.

Reflected (or echo) pulses 38 from a remote object, are received by antenna 34 and proceed through TR (transmit-receive) box 48 to receiving converter 50. The TR box is a voltage operated device effectively short-circuiting the receiver input circuit to the high power pulses of transmitter 16 but instantaneously opening the receiver input circuit for low power received reflected pulses. It can preferably be of the well-known type which comprises a resonant cavity tuned to the frequency of the emitted pulses and having a gas-filled, two-element vacuum tube connected across points in the cavity of substantial potential difference, the tube breaking down under the high power transmitted pulses to detune the cavity so that very little energy can then reach the receiving apparatus. Upon the cessation of a transmitted pulse the gas tube restores itself substantially instantaneously to condition the receiving circuit for the efficient reception of echo pulses.

Converter 50 includes a beating oscillator and converts the radio frequency echo pulses to a convenient IF frequency, usually in the neighborhood of 60 megacycles. The IF frequency pulses are then amplified in amplifier 52 and detected in video frequency detector 56. As is well known in the television art, for squared top pulse transmission, frequencies between a few cycles per second up to several megacycles per second are preferably passed with substantially equal gain by video frequency apparatus.

A portion of the detected pulse energy is amplified in video amplifier 58 and impressed upon the vertical deflecting plates of cathode-ray oscilloscope 60.

Pulses from pulse generator 12 actuate sawtooth wave generator 66 the output of which is amplified and impressed upon the horizontal deflecting plates of oscilloscope 60, causing the ray to be deflected horizontally across the screen during each interpulse interval.

Pulses from pulse generator 12 are also passed through range unit 68, which provides a continuously adjustable phase shift and hence a continuously adjustable time delay. The delayed pulses from range unit 68 actuate range step generator 64. The range step, which is simply an abrupt vertical step in the trace coincident in time with the delayed pulses, is also impressed upon the vertical deflecting plates of oscilloscope 60. By adjustment of range unit 68 the range step can be aligned with any particular echo pulse deflection appearing on the screen of oscilloscope 60. A dial or counter attached to the adjustable phase-shifting means of range unit 68 is calibrated to read directly the range or distance to the reflecting object from which the echo pulse, with which the range step is aligned, is being received. In Fig. 6, for example, pulse 502 is shown with its leading edge in alignment with the range step 510.

A pulse from generator 64, coincident in time with the range step, serves to trigger a pedestal generator 65 the output wave of which serves in turn to unblock or open the gate amplifier 70 which is biased so that it will accept only echo pulses which are coincident in time with the pedestal pulse. The pedestal pulse is simply a squared top pulse of sufficient width and amplitude to insure the unblocking of amplifier 70 during the occurrence of the echo pulse aligned with the range step.

As described above, if the reflecting object from which echo pulses are being selected is not precisely on the axis of the antenna system, i. e., the axis of reflector 32, there will be present in the received echo pulse an amplitude modulation resulting from the rotation of the antenna beam. The frequency of this modulation is of course that at which eccentric antenna 34 is rotated. This can conveniently be a relatively low frequency such as 30 cycles (or revolutions) per second.

This modulation, if present, is selected from the output of amplifier 70 by detector and filter 74 which recovers and passes frequencies in the immediate vicinity of 30 cycles per second only.

A second filter and "fade" frequency detector 72 eliminates frequencies in the immediate vicinity of 30 cycles per second but recovers and passes energy of other frequencies present in the output of amplifier 70, and thereby provides a voltage for automatic gain control amplifier 54 whereby the over-all gain of the receiving amplifier 52 is automatically regulated in accordance with the amplitude of the echo pulse aligned with the range step, after the 30 cycle amplitude modulation thereof, if present, has been removed, assuming that amplifier 70 has been unblocked to permit the passage of the selected echo pulse through it.

The output of detector and filter 74 is limited in amplitude by a simple varistor circuit in device 76, a portion of it is inverted in phase, that is, changed in phase 180 degrees, by use, for example, of any of the well-known phase inverting vacuum tube circuits whereby from a single input voltage, two voltages inverted in phase with respect to each other are obtained. One portion of the output of device 76 is supplied to "modulators" 78, 82 and the other, which is inverted in phase with respect to the first portion, is supplied to "modulators" 80, 84.

Two-phase generator 20 driven by the left end of shaft 26 of motor 22 provides a 30 cycle sine wave via circuit 42 and a 30 cycle cosine wave via circuit 44, the sine wave being supplied to "modulators" 78, 80 and the cosine wave being supplied to "modulators" 82, 84.

The output of "modulators" 78, 80 is impressed across the vertical deflecting plates of cathode-ray oscilloscope 86 and the output of "modulators" 82, 84 is impressed across the horizontal deflecting plates of oscilloscope 86.

The center of the oscilloscope screen is indicated by the intersection of cross hairs 88 on the face thereof. In the absence of any 30 cycle modulation in the output of amplifier 70 the ray will fall on the center-point of the screen and in the presence of an echo pulse from an object located precisely on the axis of the antenna system will provide a spot at that point.

If 30 cycle modulation is present the spot will be deflected in accordance with the phase of the modulation as compared by "modulators" 78, 80, 82, 84 with the phase of the reference generator 20, sine and cosine voltages. The extent of its deflection is determined by the amplitude of the 30 cycle modulation present in the echo signal up to the limit imposed by the limiter action of device 76 which is adjusted to prevent the spot from being deflected off the screen of oscilloscope 86, as this would, obviously, result in loss of the indication. Since the phase of the 30 cycle echo modulation is an index of the direction in which the reflector axis deviates from the direction of the reflecting object and the amplitude of this modulation is an index, within the limits above described, of the magnitude of the deviation, the position of the spot on the screen of oscilloscope 86 will indicate the direction and will approximately indicate the amount by which the reflector 32 should be turned to bring its axis precisely into alignment with the object.

Oscilloscope 86 is therefore designated as a train and elevation indicator. It is the oscilloscope which indicates the azimuth and elevation of the target with respect to the axis of reflector 32.

In the absence of an echo signal, the zero signal indicator 94 becomes effective by virtue of the removal of a bias supplied by unit 72 only when signal is present. Indicator 94 supplies quadrature voltages to the deflecting plates of oscilloscope 86 causing the ray of the scope to trace a small circle about the center-point of the target thus giving the operator a positive indication that no signal is being received. This is illustrated in Fig. 7 where circle 606 is the zero signal indication.

As mentioned above, details of one suitable form of the circuit including modulators 78, 80, 82, 84 are shown in Fig. 4 and the detailed operation of the circuit will become more readily apparent in connection with the description hereinafter of Fig. 4.

Likewise the details of the no-signal, or zero-signal, indicating circuit 94 are shown in Fig. 5 and its mode of operation will become readily apparent in connection with the description hereinunder of Fig. 5.

Typical indications for oscilloscope 60 are shown in Fig. 6 and will be described in more detail in connection therewith.

Typical indications for oscilloscope 86 are shown in Fig. 7 and will be described in more detail in connection therewith.

From the above description it is apparent that the system in so far as it has yet been described, functions on the basis of regulating the receiving gain in accordance with the amplitude of the echo signals received from the reflecting object after the 30 cycle modulation has been eliminated. This type of operation has been found admirably well adapted for obtaining a suitable train and elevation indication so essential for adequate gun-pointing directing systems.

However, it involves the difficulty, above mentioned, that with the gain regulated solely in accordance with the amplitude of the echo signals from a large reflecting object or target, weaker reflections from smaller reflecting objects in the vicinity of the target, such as shell splashes or shell bursts are not likely to be detected by the systems.

To overcome this difficulty a blanking pulse generator 62 is added to the system. One suitable form of such generator is shown in detail in Fig. 2 and will be described presently. The blanking pulse generator 62 operates to provide a time division mode of operation of the system by periodically blanking or disabling the automatic gain control amplifier 54, for a short period, causing the receiver to operate at full gain for that short period and at the same time it blanks or blocks the gate pedestal generator 65 for the same period. This is done to avoid subjecting the train and elevation indicating circuit to a surge of energy which would tend to render the indication provided thereby unstable, not only because of the increased amplitude of the normal echo signal but also because of noise, interference, and "fading" amplitude changes which assume troublesome magnitudes at full receiver gain particularly when introduced into a carefully balanced circuit of this character.

The range determining circuit is, of course, less critical and will register, in addition to the normal echo signal (increased in amplitude in proportion to the increase in receiver gain) minor echo signals such as those resulting from shell splashes or shell bursts in the vicinity of the target.

The degree of time division, that is, the ratio of the time duration of a period of lower gain to the time duration of a period of high gain can be varied over wide limits, satisfactory operation having been obtained for ratios between 1/1 and 4/1 or greater. The ratio of four to one by way of example has the advantage of giving excellent train and elevation indications since the effective number of pulses employed to obtain these indications is still 80 per cent of the total number of pulses transmitted and also the deflections appearing for high gain operation on the range indicator will be only one-fourth as bright as those appearing for lower gain operation and the two sets of indications can therefore be readily distinguished from each other. This condition is illustrated in Fig. 6 to be described presently hereinunder.

In addition to making it possible to determine the range of shell splashes and shell bursts the time-division arrangements of the invention make it possible to discover the presence of smaller reflecting objects in the presence of a much larger reflecting object such, for example, as discovering PT boats in the vicinity of a battleship or small fighter craft in the vicinity of a large transport plane and the like, while at the same time permitting the observer to obtain accurate train and elevation indications on the larger object.

The feature is obviously also of value in navigational-aiding radio object-locating systems since it will provide warnings of small obstacles in the vicinity of a large obstacle, reflections from which latter obstacle might otherwise obscure those from the smaller obstacles entirely.

A further advantage of the time-division arrangements of the invention is that the receiving apparatus can be accurately tuned during routine operation of the system by noting the tuning for maximum amplitude of the echoes received during the high gain interval. The signals subject to automatic gain control do not, of course, lend themselves to this purpose.

In Fig. 2 a suitable form for the blanking pulse generator 62 of Fig. 1 is shown in electrical schematic form. It comprises a conventional start-stop multivibrator circuit including double-triode vacuum tube 200 and a pulse-shaping circuit including diode vacuum tube 236.

Pulses from the pulse generator 12 of Fig. 1 are impressed upon terminal 202. The R.-C. circuit comprising condensers 226 and 216, fixed resistance 224 and adjustable resistance 228 is proportioned so that the right triode of tube 200 comprising plate 1, grid 1 and associated cathode becomes conducting upon the arrival of every fourth pulse, the left triode comprising plate 2, grid 2, and associated cathode becoming non-conductive.

The operation of the circuit of Fig. 2 is more readily explained in connection with the wave form diagrams of Fig. 3. Assuming that we are tracing the operation of the circuit of Fig. 2 starting at a time $t_0$ when grid 1 of tube 200 is biased slightly below cut-off as indicated by curve 244 of Fig. 3, this curve being designated as $E_{G1}$ since it indicates the voltage of grid 1 of tube 200, Fig. 2.

If a positive pulse large enough to cause plate 1 of tube 200, Fig. 2, to conduct is applied to grid 1 through terminal 202, Fig. 2, the potential of plate 1 will decrease by virtue of the voltage drop across resistor 218 as illustrated by curve 240 of Fig. 3, designated $E_{P1}$. The voltage on grid 2 of tube 200, Fig. 2, will drop in turn because of the coupling afforded through capacitance 208 and resistance 214 of Fig. 2. The potential of plate 2 of tube 200, Fig. 2, will then rise carrying grid 1 even more positive by the coupling through capacitance 216. This positive feedback arrangement causes the action to continue rapidly to the point where the circuit including plate 2 of tube 200, Fig. 2, is cut-off by the building up of a sufficiently large negative potential on grid 2 and the potential of plate 1 of tube 200, Fig. 2, is then at a very low voltage.

The circuit of Fig. 2 remains in this condition until the circuit including plate 2 of tube 200, Fig. 2, becomes conductive again. This will occur when capacitance 208 has discharged through resistor 212 to a potential near that of the "ground" of the circuit. The time required will, of course, be determined by the values chosen for capacitor 208 and resistor 212 and in this instance values are selected such that the time required is slightly less than the time interval between successive pulses 246 which are in synchronism with the pulses transmitted by the system. These time intervals are illustrated in Fig. 3, $t_0$ to $t_5$, inclusive, representing the timing of a series of six successive pulses 246 from generator 12 of Fig. 1 which control the emission of pulses from transmitter 16, and the interval 248 representing the discharge time of capacitance 208 through resistor 212, the latter interval being slightly less than the interval between successive pulses occurring at $t_0$ and $t_1$.

When plate 2 of tube 200, Fig. 2, again reaches the conducting point, circuit conditions suddenly reverse, i. e., the potentials at plate 2 and grid 1 of tube 200, Fig. 2, suddenly drop while those at plate 1 and grid 2 rise rapidly. If no outside influence interfered, this condition would be maintained until the capacitor 216 had discharged through resistors 224 and 228 to a voltage near the "ground" potential of the circuit. This time interval is adjusted in this particular instance to be slightly greater than three interpulse intervals ($t_1$ to $t_4$, inclusive) as shown in Fig. 3, the discharge interval commencing just before the occurrence of a pulse at time $t_1$ and continuing, if undisturbed, until time $t'_4$ along curve 244, approximately midway between the pulse occurrence times $t_4$ and $t_5$. This arrangement assumes that it is desired that the automatic gain control of the system of Fig. 1 be operative three out of every four interpulse intervals.

In the operation of the circuit, synchronizing pulses 246 occurring at the instants designated by $t_0$ to $t_5$ are superimposed upon the potential 244, but so long as these combined potentials are less than the cut-off level indicated by line 242 of Fig. 3 they have no effect. The pulse occurring at time $t_4$, however, finds the potential of $E_{G1}$, curve 244, Fig. 3 approaching the cut-off level and the combination is sufficient to cause conduction and initiate a new cycle of operation of the circuit as above described. Obviously the circuit may be readily adjusted to provide any desired time division within very wide limits by simply adjusting the "time constant" of the circuit comprising capacitor 216 and resistors 224 and 228. With reference to Fig. 3 adjusting this time constant, of course, changes the slope of curve 244 so that a greater or smaller number of pulse intervals will intervene between the time at which capacitor 216 receives its charge and the time at which curve 244 will have risen sufficiently that a pulse will carry the voltage of grid 1 above its cut-off potential.

Since capacitor 222 does not conduct direct current there is a tendency for each negative pulse through it to be followed by a pulse which is positive with respect to ground. Such a positive pulse would reduce the gain during part of the sweep. A diode 236 is therefore provided to offer a very low impedance to positive pulses and thus serves to "clip" or eliminate them. Resistors 230 and 233 and capacitor 232 complete the circuit and provide suitable coupling for the transfer of the negative pulses to the automatic gain control circuit 54 and gate pedestal generator 65 of Fig. 1, terminal 234 being the output terminal for this purpose.

In Fig. 4 a suitable form of circuit for phase comparison of the 30 cycle signal modulation with the phase of the voltages of the reference generator 20 of Fig. 1 is shown in schematic diagram form. The vacuum tubes 316, 318, 320, 322 and associated circuit elements correspond with the "modulators" 78, 80, 82, 84 of Fig. 1, respectively. Each of the above-mentioned vacuum tubes has five grids.

These modulator circuits each have the property that the plate circuit current is substantially proportional to the product of the voltages on the first and third grids, above the respective cut-offs of the tubes.

The signal modulation from device 76 of Fig. 1 is introduced at terminals 300 and 302, that on terminal 302 being inverted in phase, i. e., 180 degrees out of phase, with respect to that on terminal 300. The signal modulation on terminal 300 is applied to the first grids (nearest the cathode) of tubes 316 and 320. That on terminal 302 is applied to the first grids of tubes 318 and 322. Direct current blocking condensers 390 are included in series with each input lead to isolate the circuit from direct current input.

A bias derived from potential source 338 through resistance mesh comprising resistors 380, 384, 386 and 388 is provided to fix the first grids of tubes 316, 318, 320 and 322 at the potential which produces best modulation effects. The resistance mesh effectively isolates the two pairs of tubes above mentioned from each other and from the voltages of generator 20 of Fig. 1 in so far as the 30 cycle input voltages are concerned.

The two 30 cycle reference voltages from generator 20 of Fig. 1, designated as sine and cosine voltages to denote that they are displaced 90 degrees in phase with respect to each other, are applied, one to terminal 304 and the other to terminal 306 and through coupling resistors 324 to the third grids of tubes 316, 318 and 320, 322, respectively, as shown in Fig. 4. A negative bias, from potential source 338 through resistance meshes 326, 328 and 336, is applied to bias these grids to the proper point.

The 30 cycle reference voltages are adjusted to an effective value substantially greater than that to which the 30 cycle signal voltages are adjusted. Each of the four tubes therefore produces an effective direct current output substantially proportional to the phase difference between the reference 30 cycle wave and the 30 cycle modulation on the received echo. This output varies in magnitude with the error in pointing, that is the deviation of the axis of the reflector 32 from the object under observation. A filter comprising a series resistance 374 and two shunt capacitances 372 is provided in the output of each tube circuit to eliminate undesired modulation products.

Ganged potentiometers 354, 356 and 364, 366 and source of potential 342 provide for centering the ray of the cathode-ray oscilloscope for the condition of zero signal (i. e. no 30 cycle signal modulation). Resistors 352, 360 and 362, 370 isolate their respective plate circuits from each other and resistors 344, 346 provide the screen grids (comprising the second and fourth grids of each tube connected together) with a suitable bias. Resistors 358 and 368 complete the desired voltage division circuits for plate, screen grid and oscilloscope as shown in Fig. 4. Resistors 316 are coupling resistors whose primary function is to reduce interaction between the circuit of Fig. 4 and the zero signal indicating circuit to be described in connection with Fig. 5 hereinunder. Terminals 308, 310 of Fig. 4 are connected to the vertical deflecting plates of the cathode-ray oscilloscope, as indicated in Fig. 1, and terminals 312 and 314 are connected to the horizontal deflecting plates. In the presence of 30-cycle modulation of the received echo signals the ray of the oscilloscope will be deflected from the center of the screen in the direction in which the reflector 32 must be moved to bring its axis into alignment with the reflecting object. The amount of deflection will be roughly proportional to the amount by which the reflector 32 must be moved except for large deflections where the limiting action of device 76 of Fig. 1 comes into operation to prevent loss of the indication, which would result were the amount of deflection permitted to throw the indication beyond the limit of the oscilloscope screen.

In Fig. 5 a zero signal (and weak signal) indicating circuit is shown. In Fig. 5 the double triode vacuum tube 408, heater circuit 418 is balanced to ground and is connected to a source of 60-cycle power, as indicated in Fig. 1. Equal and opposite 60-cycle voltages are applied to the control grids of the tubes through coupling resistors 416, 412 and capacities 414. A normal direct current grid bias is also applied to the grids from potential source 422 through resistors 410 and 420. Anode potential is supplied from source 406 through isolating resistors 404 as shown in Fig. 5.

A direct current negative bias voltage obtained from the "fade" frequency detector circuit as indicated in Fig. 1, and proportional to the amplitude of the echo signal, is applied to both grids through terminals 400 and 401 and coupling resistors 402. In the absence of an echo signal, this voltage is substantially zero and the remaining bias voltages, above described, permit plate currents to flow producing equal and opposite 60 cycle voltages which are applied to one set of deflecting plates of the cathode-ray oscilloscope while the simple resistance-capacitance phase shifting networks comprising resistances 424 and capacitances 426 provide a second pair of equal and opposite 60 cycle voltages displaced 90 degrees in phase with respect to the first pair the latter voltages being impressed upon the second set of deflecting plates of the oscilloscope. Coupling capacities 428 serve to isolate the output from direct current potential source 406. Terminals 430 and 436 are, for example, connected to the vertical deflecting plates of the oscilloscope and terminals 432 and 434 are then connected to the horizontal deflecting plates thereof. The circuit and bias potentials of Fig. 5 are proportioned so that, in the absence of an echo signal, the oscilloscope ray will trace a small circle, for example, a circle of approximately ¼ inch in diameter. Such a zero signal indication is illustrated by circle 606 of Fig. 7.

When an echo signal is received a bias is applied to terminal 400 as above mentioned, the amplitude of the bias being substantially proportional to that of the echo signal. If the echo signal amplitude is sufficient to provide an entirely reliable indication the bias applied to terminal 400 is sufficient to completely cut off tube 408 eliminating the 60 cycle energy from its plate circuits and contracting the circle indication on the oscilloscope into a single spot, such as spot 608 of Fig. 7. For signal amplitudes below this cut-off value but above zero, the amplitudes of the 60 cycle plate voltages of tube 408 will be reduced and an indication in the form of a circle of reduced diameter will be provided on the oscilloscope target such as circle 610 of Fig. 7. This circle of reduced diameter will, of course, be displaced from the center of the target if the reflecting object under observation is displaced from the normal axis of reflector 32 of Fig. 1.

The circuit of Fig. 5 therefore provides a no-signal or zero signal indication and also indicates when a received reflected signal is of sufficient amplitude that the directive indications can be considered entirely reliable.

In Fig. 6 typical signal patterns on the range oscilloscope 60 of Fig. 1, for controlled gain and for maximum gain in accordance with a time-division scheme of operation, as described above, are illustrated. Circle 500 represents the screen of the oscilloscope. Assuming that the echo signal controlled gain is effective three quarters of the time, the selected reflected or echo signal 502 for controlled gain will be of approximately the same height as the range step 510 which is aligned to coincide with its leading edge as shown in Fig. 6. With maximum gain effective the remainder of the time, echo signal 502 will appear as a signal 504 of increased amplitude but the trace 504 will be perceptibly lighter or fainter than trace 502 in proportion to the time-division between the two effective gain periods. Other faint line echo indications will appear for the maximum gain intervals whose amplitudes may be relatively small, such as indications 506 and 508 representing smaller reflecting objects such as shell bursts, shell splashes, or small craft, or other reflecting objects, at the approximate range of the main target. Other bright or heavy echo signals such as 502 may, of course, be present with controlled gain and will be similarly increased in amplitude for the maximum gain intervals but none are shown as it is felt that they would merely tend to confuse the showing of Fig. 6. Small echoes, such as 506 and 508, which appear only momentarily following the firing of shells indicate the ranges at which shells are exploding or striking the water and their deviations in range from the selected target echo serve to indicate, directly, range corrections which should be made in firing at the target. Because of the retentivity of cathode-ray screens normally employed in gun directing systems of the type illustrated in Fig. 1 heavy and light indications will appear simultaneously and the indications on the pointing indicator 86 of Fig. 1 will not decrease perceptibly in brilliance during the short intervals of maximum receiving gain when the pointing indicator is blocked to protect it from disturbing surges and random amplitude variations.

In Fig. 7, circle 600 represents the screen of train and elevation (or pointing) oscilloscope 86 of Fig. 1. Circle 606 represents a zero signal or no signal indication. Circle 610 of diminished diameter represents a directional indication with a signal of lower amplitude than is desirable for entirely accurate directive indications but it can be employed (with reservations). Circle 610 indicates that the normal axis of reflector 32 of Fig. 1 must be raised and turned slightly to the right to bring it on the target. Spot 608 indicates that the echo signal amplitude is sufficient to provide an entirely dependable directive indication and that the normal axis of reflector 32 of Fig. 1 must be lowered and turned to the right to bring it on the target. As previously mentioned the amount of deflection radially from the center of the screen, as indicated by the intersection of vertical cross-hair 602 and horizontal cross-hair 604, is proportional to the deviation of the axis of reflector 32 from the object within limits fixed by the limiting action of device 76 of Fig. 1 designed to prevent the loss of an indication by deflection off the screen. Under normal operating conditions only one of the above described indications will usually be present on oscilloscope screen 600 at any particular instant since the gate amplifier 70 of Fig. 1 will be operative only during the occurrence of the pedestal pulse from generator 65 of Fig. 1.

Numerous other arrangements embodying the principles of the invention will readily occur to those skilled in the art. The scope of the invention is defined in the following claims.

What is claimed is:

1. In a radio reflection type object locating system providing, simultaneously, range indications and high precision directional indications subject to automatic volume control, a time division system to afford indications of the range of smaller reflecting objects in the vicinity of a large reflecting object which includes means for periodically raising the receiving gain of the system to a high value for a short interval of time and means for protecting the high precision directional indicating apparatus during said short high gain interval, whereby the presence of small objects in the vicinity of a larger object can be detected without interfering with precise observations of the direction of the larger object.

2. In combination a pulse reflection object detecting and ranging system including means for periodically emitting exploratory energy pulses, means for receiving reflections of said pulses, means for automatically controlling the receiving gain of said system, means for selecting a particular one of the reflections and controlling said gain controlling means in accordance with said particular one of said reflections, and means cooperatively coupled with the pulse emitting means and responsive to a predetermined number of energy pulses from said last stated means to render said gain controlling means inoperative for one interpulse interval following each said predetermined number of energy pulses, whereby an interpulse interval of maximum receiving gain can be effected after each predetermined number of energy pulses and shell bursts or splashes and other small reflecting objects can be observed simultaneously with the regular operation of the system.

3. In a radio reflection type object locating system of the class which includes in combination a first means for repeatedly generating short electrical pulses, a second means, controlled by said first stated means, for emitting radio energy pulses, a third means for directively receiving and detecting reflections of said radio pulses, a fourth means for automatically controlling the volume of said receiving means and a fifth means cooperatively associated with said first and said third means for indicating the range of objects from which reflections are received; a sixth means for periodically disabling said fourth means, said last stated means having a periodicity less than that of said first stated means whereby range indications of shell bursts and other small reflecting objects can be observed simultaneously with range indications of large objects from which more powerful reflections are obtained.

4. The arrangement of claim 3 and a seventh means cooperatively associated with said third means for providing directional indications and an eighth means controlled by said sixth means for protecting said seventh means during intervals in which said fourth means is disabled.

OWEN E. DE LANGE.